United States Patent [19]

Huss et al.

[11] Patent Number: 5,034,639
[45] Date of Patent: Jul. 23, 1991

[54] STATOR DRAIN AND ELECTRICAL APPARATUS EMPLOYING THE SAME

[75] Inventors: John B. Huss; Mahesh J. Shah, both of Rockford, Ill.

[73] Assignee: Sundstrand Corporation

[21] Appl. No.: 540,200

[22] Filed: Jun. 19, 1990

[51] Int. Cl.⁵ .......................... H02K 9/16; H02K 9/00
[52] U.S. Cl. ..................... 310/60 A; 310/54; 310/58
[58] Field of Search .................. 310/89, 52, 53, 54, 310/61, 60 A, 254, 58

[56] References Cited

U.S. PATENT DOCUMENTS

| | | |
|---|---|---|
| 2,476,892 | 7/1949 | Mueller . |
| 2,545,335 | 3/1950 | Becker ............................ 171/252 |
| 4,262,224 | 4/1981 | Kofink et al. ..................... 310/54 |
| 4,305,031 | 12/1981 | Wharton . |
| 4,311,932 | 1/1982 | Olson ............................... 310/61 |
| 4,514,652 | 4/1985 | Olson . |
| 4,644,207 | 2/1987 | Catterfeld et al. . |
| 4,654,577 | 3/1987 | Howard . |
| 4,728,840 | 3/1988 | Newhouse . |
| 4,745,314 | 5/1988 | Nakano ............................. 310/57 |
| 4,879,484 | 11/1989 | Huss . |
| 4,947,639 | 8/1990 | Hibner et al. .................... 60/39.02 |

Primary Examiner—Steven L. Stephan
Assistant Examiner—Dennis R. Haszko
Attorney, Agent, or Firm—Antonelli, Terry, Stout & Kraus

[57] ABSTRACT

A stator drain supports stator windings and rotor bearings and permits fluid coolant for the rotor bearings to be drained outward past the stator windings from the bearings. The drain is formed of a non-metallic material and has an inner surface for supporting a bearing liner of the rotor bearings, a plurality of spaced openings for receiving stator windings and drain slots extending through the annular member at locations corresponding to spaces between the stator windings for draining the fluid coolant. The stator drain is useful in a dual permanent magnet generator, for example.

25 Claims, 3 Drawing Sheets ial apparatus, particularly a dual permanent magnet generator, having at least one stator with at least one rotor arranged therein for rotation about an axis relative to the stator.

BACKGROUND ART

Prior to the development of the dual permanent magnet generator (PMG), aircraft typically used wound field generating systems as a power supply. With weight and size considerations becoming of increased importance, however, PMG devices of the type shown in U.S. Pat. Nos. 4,305,031 and 4,654,577 were developed. These generators were considered relatively small and lightweight devices for generating electrical power from a motive power source because they do not require a separate electrical source for field excitation.

A PMG does not require a complex cooling apparatus and eliminates the need for a convertor by driving the system with a constant speed drive to limit the maximum voltage excursion in the case of a system fault. The output voltage of a PMG is, however, a function of the relative speed between the rotor and stator and of the current drawn by a load. This drawback has prevented PMG's from being used as a main power source in aircraft in lieu of wound field machines having exciters and rotating rectifiers driven at high speed. These high speeds required complex cooling apparatus to dissipate heat developed on the windings and in the rotating rectifiers.

When used in a generator, there is a set voltage on the generator which varies as the load varies and which cannot be controlled electronically. It has been found that the rotors in PMGs create a voltage control problem as the load varies. A dual permanent magnetic generator concept controls voltage by shifting two high speed rotors in and out of phase to keep the voltage constant as the load varies. For example, at a two per unit load, the magnetic poles are aligned, whereas at no load, the magnetic poles would be 78° out of phase. If the main high speed rotors of the PMG which, at no load, are out phase with each other by about 78° were kept in the same phase relationship as the generator load is increased, the output voltage would droop.

A PMG system using left-hand and right-hand helical ball splines to effect adjustment of rotors relative to each other is disclosed in commonly assigned U.S. Pat. No. 4,879,484. This system comprises a stator having an output winding for producing an output voltage, a rotor within the stator, the rotor including first and second magnet rotors rotatable about a common axis and a mechanism for angularly adjusting the first and second rotors relative to one another about the common axis. The angular adjustment of the rotors provides for rotation of each of the first and second rotors in opposite directions relative to the other for causing a relative angular adjustment of the rotors. Rotating the rotors simultaneously in opposite directions, each by half the required angle n requires much less power to overcome inertia than rotating only one rotor the full angle. A common drive shaft extending along the common axis of the rotors is used for rotatably driving both the first and second rotors about the common axis.

Left- and right-hand helical ball splines are located between the driven shaft and the first and second rotors, respectively. Rotation of the first and second rotors in opposite directions relative to one another is accomplished by causing axial movement of the drive shaft along the common axis relative to the rotors. In the system of the aforementioned patent, bearings are provided for rotatably supporting the rotors at essentially fixed locations at their ends along the common axis, and the drive shaft is permitted to move axially along the common axis relative to the rotors for angular adjustment of the rotors. The means for axially moving the drive shaft comprises a hydraulic drive means or an electric motor. In either case, the use of the oppositely directed helical ball splines together with the axial movement of the single drive shaft, reduces the friction required for angular adjustment of the rotors and thereby reduces the power necessary for accomplishing the adjustment.

One problem encountered with a dual PMG of the aforementioned type concerns the need to support and oil cool the center rotor bearings, that is, those bearings rotatably supporting the adjacent ends of the two in-line rotors of the generator. Electrical losses should be avoided or kept to a minimum as part of a solution to this problem.

U.S. Pat. No. 2,476,892 discloses a twin-motor bearing housing construction having a central bearing-housing which has a lubricating pipe. U.S. Pat. No. 4,728,840 depicts a water-cooled AC and DC motor-generator set on a common shaft with series cooling flow path. U.S. Pat. No. 4,514,652 relates to a liquid cooled high speed synchronous machine wherein oil flows axially through the stator in a single rotary generator. U.S. Pat. No. 4,644,207 is directed to an integrated dual pump system having center bearing separating two rotors. The bearings are supplied with lubricant through passages that extend radially into the bearings.

DISCLOSURE OF INVENTION

An object of the present invention is to solve the aforementioned problem in connection with supporting and oil cooling the center bearings in an electrical apparatus, particularly in a dual permanent magnet generator and, to do so, in a manner which does not result in unacceptable electrical losses.

These and other objects of the invention are attained by the stator drain of the invention for use in an electrical apparatus having at least one stator with at least one rotor arranged therein for rotation about an axis relative to the one stator with rotor bearing means being provided for rotatably supporting the rotor. The stator drain of the invention comprises an annular member preferably formed of a non-metallic material to eliminate electrical, eddy current losses which would occur in a magnetic metallic material, the annular member having inner surface means for supporting rotor bearing means of an electrical apparatus, a plurality of spaced openings for receiving stator windings of the electrical apparatus, and fluid passage means extending through the annular member for draining a fluid coolant from the rotor bearing means supported on the inner surface means outwardly past the stator windings of the electrical apparatus received in the openings of the annular member. By means of the stator drain, oil coolant flowing axially along the a drive shaft of the rotors to the rotor bearing means for cooling the rotor bearing means, can drain through the stator drain to an outlet in a stator housing of the electrical apparatus for recirculation. Advantageously, the fluid coolant flowing through the stator drain from the rotor bearing means cools the stator windings supported in the stator drain as it flows outwardly through spaces provided in the stator windings.

According to the disclosed, preferred embodiment of the invention, the inner surface means of the annular member of the stator drain comprises first and second axially spaced, inwardly facing annular surfaces for supporting the rotor bearing means. The plurality of spaced openings include first and second annular arrays of circumferentially spaced, generally axially directed openings located radially outward of respective ones of first and second inwardly facing annular surfaces. Respective ones of the openings in the first and second arrays are axially aligned with one another in spaced relation for receiving common, generally axially extending stator windings in the case the two stators of the electrical apparatus share a common winding. However, each stator could have its own winding with the stator windings being connected in series for the dual permanent magnet generator.

Another feature of the stator drain of the invention is that the fluid passage means comprises a plurality of drain slots which are arranged so that they are adjacent respective spaces between stator windings when stator windings are located in the openings of the annular member. The fluid passage means further includes an annular channel formed in an outer surface of the annular member in communication with the radially outer ends of the plurality of drain slots. The stator drain further includes an annular channel formed in an inner surface of the annular member adjacent the plurality of spaced openings so that stator windings can extend through the inner annular channel with clearance between the windings associated with the respective openings for passage of fluid coolant therethrough, when the stator drain is in use in the electrical apparatus. The annular member of the disclosed embodiment is formed of two annular components which are bonded to form the annular member. Each of the annular components can be made by injection molding. Alternatively, the annular member of the stator drain could be formed as one piece.

An electrical apparatus of the invention which employs the stator drain of the invention comprises at least one stator having stator windings and at least one rotor which is arranged in the stator for rotation about an axis relative to the stator. Rotor bearing means rotatably support the at least one rotor. First fluid passage means deliver a fluid coolant to the rotor bearing means and the stator drain of the invention drains the fluid coolant from rotor bearing means supported on inner surface means of the annular member of the stator drain. A plurality of spaced openings in the annular member have stator windings extending therethrough. Second fluid passage means located in the annular member of the stator drain extend through the annular member for draining the fluid coolant from the rotor bearing means supported on the inner surface means outwardly past the stator windings which cools the stator windings. In the preferred embodiment, the electrical apparatus comprises first and second in-line rotors having adjacent ends which are both rotatably supported by rotor bearing means supported on the inner surface means of the annular member. The electrical apparatus is a dual permanent magnetic generator but other electrical apparatus of the aforementioned general type could advantageously employ the stator drain of the invention.

The center rotor bearing means in the permanent magnet generator includes a bearing liner which is interference fitted against the inner surface means within the annular member. The bearing liner is provided with a plurality of openings through which the coolant fluid can flow from the rotor bearing means supported on the inner surface means to the stator drain. The flow of fluid coolant to the rotor bearing means is through the first fluid passage means, at least a portion of which is located in a drive shaft for the rotors.

These and objects, features and advantages of the present invention will become more apparent from the following description when taken in connection with the accompanying drawings, which show, for the purpose of illustration only, one preferred embodiment in accordance the present invention.

BEST MODE FOR CARRYING OUT THE INVENTION

Figure 1:
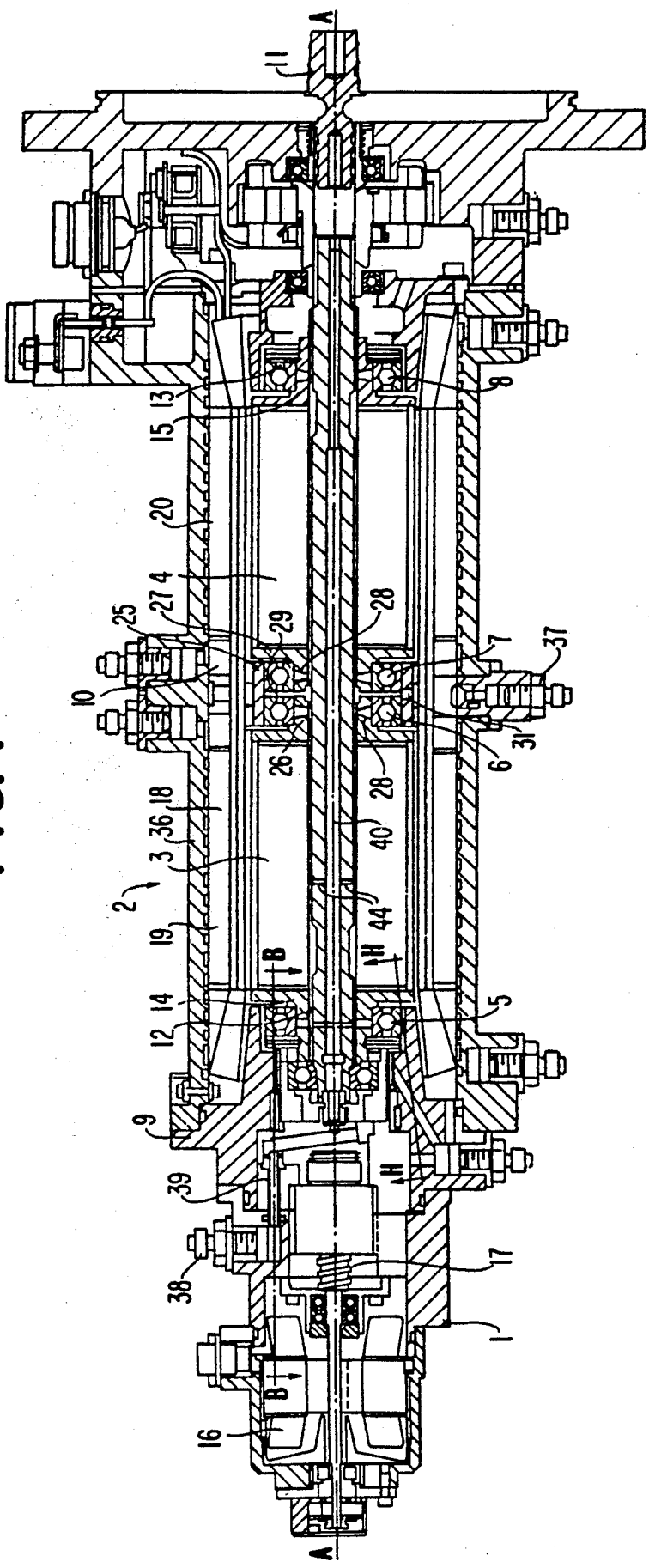
FIG. 1 is a cross-sectional view taken along the central longitudinal axis of a dual permanent magnet generator of the invention which includes the stator drain of the invention.

Referring now to the drawings, an alternating current, dual permanent magnet generator according to the invention is illustrated in Figure. The generator comprises a stator 2 having an output winding for producing an output voltage, and a first magnet rotor 3 and a second rotor 4 rotatably supported within the stator 2 by means of bearings 5, 6, 7 and 8 carried by a frame 9 of the generator. More particularly, the center bearings 6 and 7 are supported within a stator drain 10 according to the invention as discussed in more detail below. The rotors 3 and 4 are adapted to be rotated at high speed in the same direction within the stator 2 about a common axis of rotation A-A for generating an alternating current. In order to control the voltage as the generator load varies, the rotors 3 and 4 are angularly adjusted relative to one another about the axis of rotation A—A.

As in the generator disclosed in U.S. Pat. No. 4,879,484, for example, in order to minimize the amount of power required for the angular adjustment of the rotors relative to one another, the two rotors 3 and 4 are rotatably driven by a common drive shaft 11 which in turn is rotatably driven by a suitable motor through appropriate gearing. The rotors 3 and 4 are rotatably driven by the shaft 11 by way of helical ball splines 12 and 13. The ball spline 12 is a left-hand, helical ball spline and the ball spline 13 is a right-hand, helical ball spline. The helical ball splines comprise oppositely directed grooves in the respective ends of the drive shaft. Balls of the ball splines are positioned in the grooves and also in respective helical grooves formed in the cooperating annular sleeves 14 and 15 of the rotors 3 and 4, respectively. The helical ball splines serve to transmit the rotation of the drive shaft to the rotors 3 and 4 during operation of the generator and, in addition, with axial movement of the drive shaft 11 along the axis A—A an angular adjustment of the rotors 3 and 4 relative to each other can be affected, either during a high speed rotation of the rotors or while the rotors are stationary.

Because the grooves in the respective ends of the drive shaft 11 are oppositely directed an axial motion of the drive shaft 11 along the axis A—A will cause the rotors 3 and 4 to simultaneously rotate in opposite directions relative to one another a like amount. That is, each is rotated a magnitude of one-half the necessary relative rotation between the rotors as a result of an axial motion of the drive shaft 11. The axial motion of the drive shaft li is accomplished using an electric motor 16 and a rotarY-to-axial translating device 17 such as a ball screw connected to the drive shaft 11 for adjusting the angular position of the rotors 3 and 4 relative to one another about the axis A—A. Specifically, the motor 16 rotates the ball screw 17, which actuates the drive shaft back and forth along the axis A—A. Alternatively, the axial motion of the drive shaft can be accomplished hydraulically as with a piston cylinder unit, for example.

The stator 2 actually comprises two stators 19 and 20 which are in-line on the same center line as shown in FIG. 1. The stator windings 18 of the two stators 19 and 20 are connected in series. In the illustrated embodiment, the stators 19 and 20 associated with the respective rotors 3 and 4 share a common winding but this could be otherwise. The two rotors 3 and 4 arranged in-line with bearings 6 and 7 between them allow the rotors to rotate independently from one another for the necessary relative angular adjustment. In order to efficiently provide a lubricant-coolant to and from these bearings, the stator drain 10 of the invention is provided to support the bearing arrangement and allow the coolant oil to drain through the stator windings. As shown in more detail in FIGS. 2–5, the stator drain 10 comprises an annular member 22 which is formed with first and second axially spaced, inwardly facing annular surfaces 23 and 24 for supporting the center rotor bearings 6 and 7. For this purpose, a bearing liner 25 of the bearing arrangement is pressed into the stator drain 10 against the annular surfaces 23 and 24 with an interference fit. For example, the outside diameter of the bearing liner can exceed the inside diameter of the annular surfaces 23 and 24 of the stator drain 10 by 0.003 inch. In turn, the center rotor bearings 6 and 7 are received, with a clearance fit of typically 0.001-0.002 inch in the bearing liner 25.

The center bearings 6 and 7 in turn rotatably support the respective free ends of the rotors 3 and 4. Namely, the outer ends of rotor end caps 26 and 27 of the rotors 3 and 4, respectively, are rotatably supported within the bearing liner 25 and stator drain 10 by way of the center bearings 6 and 7. Orifices 28 are formed through the rotor end cap to allow the passage of the oil lubricant-coolant flowing along drive shaft 11 to move outwardly through the rotor end caps to the bearings 6 and 7.

Figure 6:
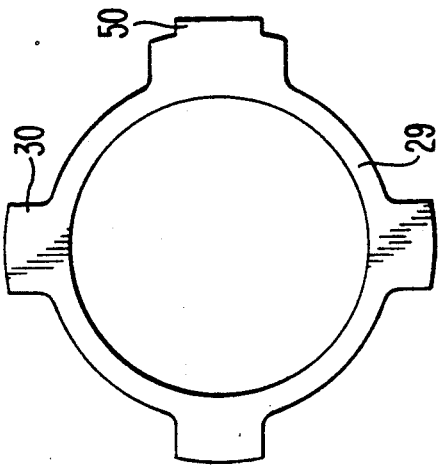
FIG. 6 is an elevational view of a spacer located between the rotor bearings of the generator.

An annular spacer 29 is located about the drive shaft 11 between the free ends of the rotor end caps 26 and 27 of the rotors 3 and 4 and between the bearing 6 and 7. The spacer is formed of stainless steel and permits axial loading of the bearings and rotors while allowing outflow of oil. For this purpose, as shown in FIG. 6, the spacer is formed with four, spaced ears 30 on its outer periphery which contact the inner surface of the outer race bearing liner 25. The extra tab 50 is inserted into one of the slots in the bearing liner. This keeps the spacer 29 and the outer races of the bearings (which are preloaded against spacer 29) from rotating. The orifices 28 in the rotor end cap can have a diameter of 0.015 inch, for example, with two being spaced circumferentially about the end of each rotor end cap. The bearing liner 25 is formed with six slots 31 extending therethrough from the radially inner surface to the outer surface for allowing oil to escape through the bearing liner to the stator drain 11. The six slots 31 are uniformly spaced about the circumference of the bearing liner 25, for example, and of a sufficient cross-sectional area to permit the outflow of oil.

Figure 3:
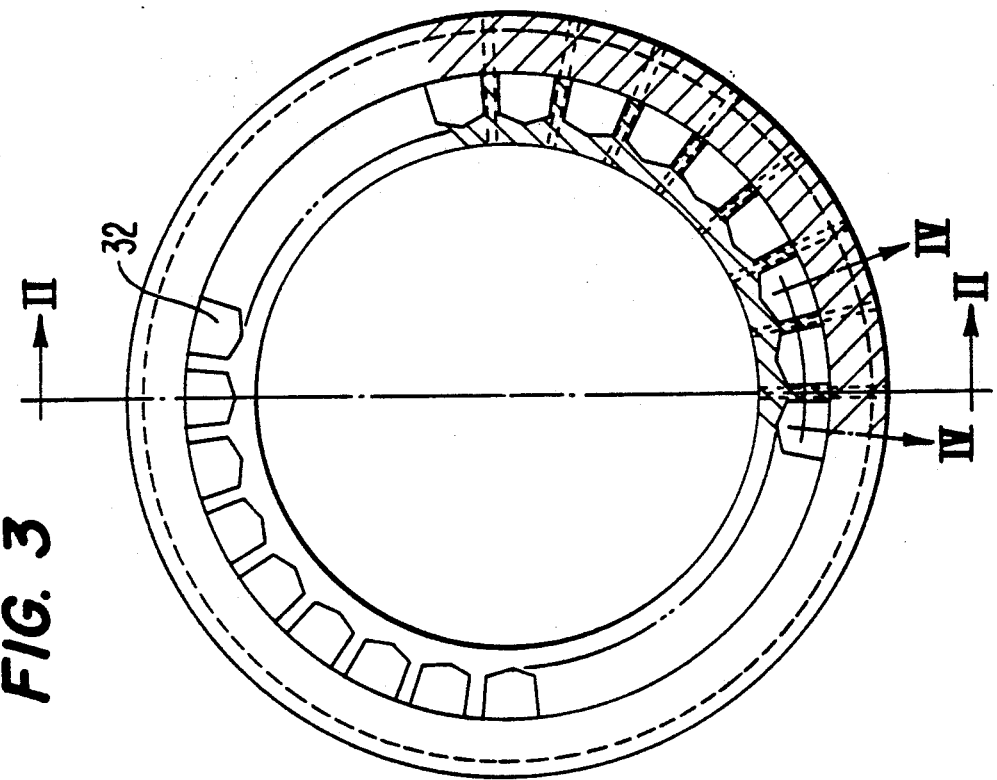
FIG. 3 is a side view of the stator drain as seen from the right side in FIG. 2 and looking in the direction of the central longitudinal axis of the stator drain.
Figure 2:
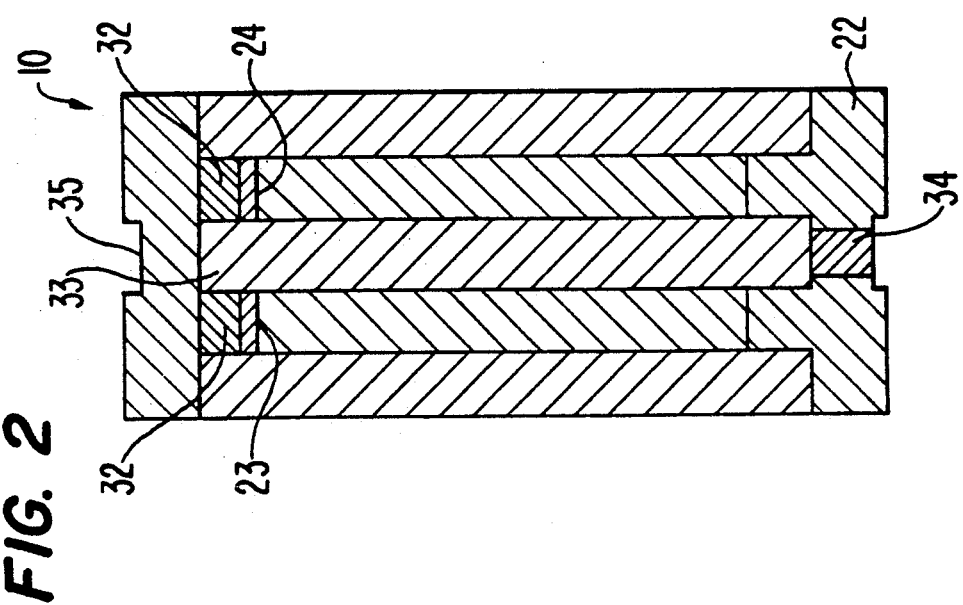
FIG. 2 is an enlarged cross-section view through the central longitudinal axis of the stator drain of the invention employed in the electrical generator of FIG. 1 taken along the line II—II of the stator drain as depicted in FIG. 3.
Figure 4:
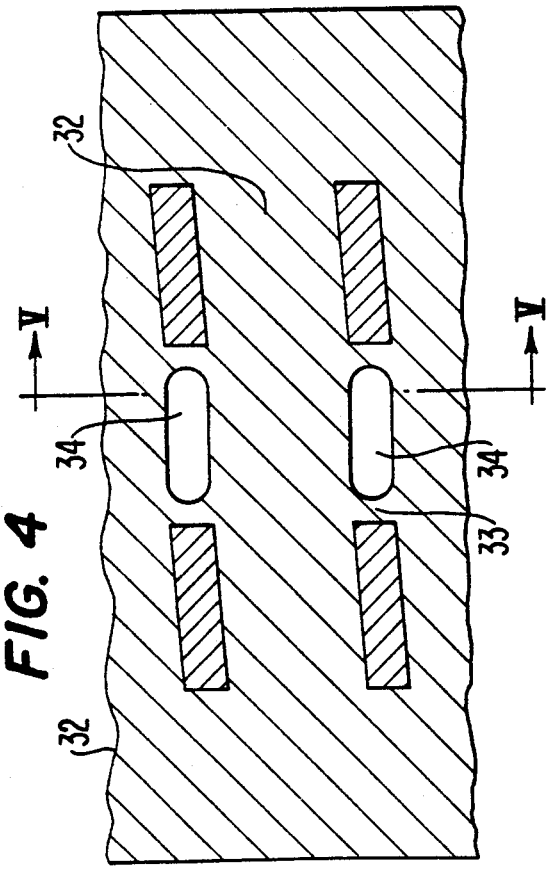
FIG. 4 is a sectional view of a portion of the stator drain taken along the line IV—IV in FIG. 3 and illustrating two drain slots in the stator drain.
Figure 5:
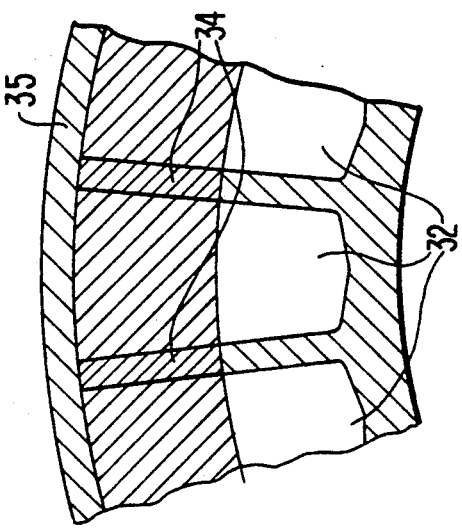
FIG. 5 is a sectional view through a portion of the stator drain taken along the line V—V in FIG. 4 and showing the relationship of the drain slots and stator winding openings in the stator drain.

The stator drain 10 further comprises a plurality of spaced openings 32 for receiving stator windings 18. The openings are arranged in first and second annular arrays of circumferentially spaced, generally axially directed openings located radially outward of the respective inwardly facing annular surfaces 23 and 24 as illustrated in FIGS. 2 and 3. Respective ones of the openings 32 in the first and second arrays are axially aligned with one another in spaced relation, on respective sides of an inner annular channel 33, for receiving common, generally axially extending stator windings 18. Oil flowing through the apertures 31 in the bearing liner 25 flows into the inner annular channel 33 between spaces between the generally axially extending stator windings 18 extending therethrough. The spaces between the stator windings result because of the spaced arrangement of the respective aligned openings 32 in the first and second arrays of openings which receive that stator windings. Oil flowing through the spaces between the stator windings in the inner annular channel 33 cools the stator windings. Fluid passages in the stator drain then convey the coolant to the outer surface of the stator drain. Particularly, a plurality of drain slots 34 extend radially outward from the inner annular channel 33 to annular channel 35 formed in the outer surface of the annular member of the stator drain. The drain slots 34 are shown in greater detail in FIGS. 4 and 5. As seen therein, the drain slots are aligned with spaces between the openings 32 for the stator windings to ensure a free flow of the coolant between the stator windings extending through the inner annular channel 33. The outer annular channel 35 acts as a reservoir from which oil is free to flow about the annular member of the stator drain between the stator drain and the outer housing 36 of the generator i. Oil in the outer annular channel 35 is drained from the generator through outlet 37 in the housing. Oil for cooling the bearings is introduced into the housing though inlet 38 and flows by way of passage 39 to central aperture 40 within drive shaft 11 to orifices 44 where it flows to the outer surface of the shaft 11 and along the shaft to the orifices 28 in the rotor end caps.

The stator drain 11 is preferably formed of two pieces as by injection molding with the two components being adhesively bonded to one another along the bond line, shown in dash lines in FIG. 2. The respective halves of the drain slots 34 are formed on the outer surface of each component as by laser machining prior to bonding the two components together. Alternatively, the stator drain could be made as one piece, instead of two. The material of the stator drain is necessarily a high strength material which withstands the high compressive forces required to properly support the bearings and bearing liner which is assembled therein with an interference fit. The material used to form the stator drain is a non-metallic material to reduce electrical, eddy current losses. For example, a glass-filled, synthetic resin composite having a compressive strength of 40,000 psi or more could be employed. One example of such a material is Fiberite E260H.

In forming the stator 2 with the stator drain 10 of the invention, the completed stator drain 10 is assembled with the stator windings 18 extending through the openings 32 thereof with spaces remaining between the stator windings in the inner annular channel 33 for draining the coolant. The drain passages between the stator windings and through the stator drain are filled with a thermal wax having a melting point of 200° F. or other temperature above the curing temperature of a potting material for potting the stator. The stator windings are then potted in a conventional material at a temperature less than the thermal wax in the drain passages. Thereafter, the assembly is heated to a temperature above the melting temperature to melt out the wax leaving the open passages for draining the coolant through the stator drain and the stator windings extending therethrough.

While we have shown and described only one embodiment in accordance with the present invention, it is understood that the same is not limited thereto, but is susceptible to numerous changes and modifications as known to those skilled in the art. For example, the stator drain of the invention can be employed in other electrical apparatus than the dual permanent magnet generator of the invention. Therefore, we do not wish to be limited to the details shown and described herein, but intend to cover all such changes and modifications as are encompassed by the scope of the appended claims.

We claim:

1. A stator drain for use in an electrical apparatus having at least one stator with at least one rotor arranged therein for rotation about an axis relative to said at least one stator with rotor bearing means being provided for rotatably supporting said at least one rotor, of the electrical apparatus, said stator drain comprising an annular member having inner surface means for supporting rotor bearing means of an electrical apparatus, a plurality of spaced openings for receiving stator windings of at least one stator of the electrical apparatus, and fluid passage means extending through said annular member for draining a fluid coolant from the rotor bearing means supported on said inner surface means outwardly past the stator windings of the electrical apparatus received in said openings of the annular member, wherein said fluid passage means comprise a plurality of drain slots which are arranged so that they are adjacent respective spaces between stator windings when stator windings are located in said openings of the annular member.

2. A stator drain according to claim 1, wherein the annular member of the stator is formed of a nonmetallic material.

3. A stator drain according to claim 1, wherein the inner surface means of the annular member comprises first and second axially spaced, inwardly facing annular surface for supporting said rotor bearing means.

4. A stator drain according to claim 1, wherein said plurality of spaced openings include first and second annular arrays of circumferentially spaced, generally axially directed openings located radially outward of said inner surface means.

5. A stator drain according to claim 4, wherein respective ones of the openings in the first and second arrays are axially aligned with one another in spaced relation for receiving common, generally axially extending stator windings.

6. A stator drain according to claim 1, wherein said fluid passage means includes an annular channel formed in an outer surface of said annular member and a plurality of circumferentially spaced drain slots communicating with the annular channel at their radially outer ends.

7. A stator drain according to claim 1, wherein the stator drain is for use in a stator of an electrical apparatus having first and second in-line rotors with adjacent ends, said inner surface means of said annular member supporting bearing means for both of the adjacent rotor ends.

8. A stator drain according to claim 1, wherein said fluid passage means includes an annular channel formed in an inner surface of said annular member adjacent said plurality of spaced openings so that stator windings can extend through said inner annular channel with clearance between the windings associated with the respective openings for passage of fluid coolant therethrough.

9. A stator drain according to claim 1, wherein said annular member is formed of two annular components which are bonded together to form said annular member.

10. A stator drain for use of an electrical apparatus having first and second in-line rotors which are arranged respective ones of first and second stators of the apparatus for rotation about a common axis with adjacent ends of the rotors being rotatably supported by bearing means located radially inward of stator windings of the electrical apparatus, said stator drain comprising an annular member being formed of a non-metallic material and having an inner surface means for supporting rotor bearing means for rotatably supporting the adjacent ends of the first and second rotors, a plurality of spaced openings for receiving stator windings of the electrical apparatus, and fluid passage means extending through said annular member for draining a fluid coolant from the rotor bearing means outward past the stator windings of the electrical apparatus received in said openings of the annular member, wherein the inner surface means of the annular member comprises first and second, axially spaced, inwardly facing annular surfaces for supporting said rotor bearing means with an inner annular channel being located between said first and second annular surfaces, said plurality of spaced openings including first and second annular arrays of circumferentially spaced, generally axially directed openings located radially outward of the respective first and second annular surfaces with respective one of the openings in the first and second arrays being generally axially aligned with one another in spaced relation across said inner annular channel for receiving common, generally axially extending stator windings, and wherein said fluid passage means comprises a plurality of drain slots communicating with said inner annular channel at locations which correspond to respective spaces between stator windings when stator windings are extend from said openings and through said inner channel, said fluid passage means further including an outer annular channel formed on an outer surface of said annular member, said plurality of drain slots communicating with the outer annular channel at their radially outer ends.

11. An electrical apparatus comprising at least one stator having stator windings and at least one rotor which is arranged in said at least one stator for rotation about an axis relative to said at least one stator, rotor bearing means for rotatably supporting said at least one rotor, first fluid passage means for delivering a fluid coolant to said rotor bearing means, and a stator drain for draining the fluid coolant, said stator drain including an annular member having inner surface means for supporting rotor bearing means for the at least one rotor, a plurality of spaced openings in which the stator windings of the electrical apparatus are located, and second fluid passage means extending through said annular member for draining the fluid coolant from the rotor bearing means supported on said inner surface means outwardly past the stator windings of the electrical apparatus which are located in the annular member, and wherein said second fluid passage means comprise a plurality of drain slots which are arranged so that they are adjacent respective spaces between stator windings which extend through said openings in the annular member.

12. The electrical apparatus according to claim 11, wherein said apparatus comprises first and second in-line rotors having adjacent ends which are both rotatably supported by rotor bearing means supported on said inner surface means of the annular member.

13. An electrical apparatus according to claim 12, wherein said apparatus is a dual permanent magnet generator.

14. An electrical apparatus according to claim 11, wherein said rotor bearing means supported on the inner surface means of the annular member include a bearing liner which is supported against said inner surface means of said annular member.

15. An electrical apparatus according to claim 14, wherein said bearing liner is interference fit against said inner surface means within said annular member.

16. An electrical apparatus according to claim 14, wherein said bearing member is provided with at least one opening through which coolant fluid can flow from said rotor bearing means supported on said inner surface means to the stator drain.

17. An electrical apparatus according to claim 11, further comprising an outer housing surrounding said stator, said housing including a fluid coolant outlet, an wherein said second fluid passage means in said annular member conveys fluid coolant from the rotor bearing means supported on said inner surface means through said stator drain to said fluid coolant outlet of the housing.

18. An electrical apparatus according to claim 11, further comprising a drive shaft for said at least one rotor, at least a portion of first fluid passage means for flowing fluid coolant to the rotor bearing means being located in said drive shaft.

19. An electrical apparatus according to claim 11, wherein the annular member of the stator is formed of a non-metallic material.

20. An electrical apparatus according to claim 11, wherein the inner surface means of the annular member comprises first and second axially spaced, inwardly facing annular surfaces for supporting rotor bearing means.

21. An electrical apparatus according to claim 11, wherein said plurality of spaced openings include first and second annular arrays of circumferentially spaced, generally axially directed openings located radially outward of said inner surface means.

22. An electrical apparatus according to claim 21, wherein respective ones of the openings in the first and second arrays are axially aligned with one another in spaced relation and contain common, generally axially extending stator windings.

23. An electrical apparatus according to claim 11, wherein said second fluid passage means includes an annular channel formed in an outer surface of said annular member and a plurality of circumferentially spaced drain slots communicating with the annular channel at their radially outer ends.

24. An electrical apparatus according to claim 11, wherein said second fluid passage means includes an annular channel formed in an inner surface of said annular member adjacent said plurality of spaced openings in which said stator windings are located so that said windings extending from said openings through said inner annular channel with clearances between the windings the respective openings for drainage of fluid coolant therethrough.

25. An electrical apparatus according to claim 11, wherein said annular member is formed of two annular components which are bonded together to form said annular member.

* * * * *